United States Patent [19]
Orenstein et al.

[11] Patent Number: 5,976,038
[45] Date of Patent: Nov. 2, 1999

[54] APPARATUS FOR DETECTING MOVING BALL

[75] Inventors: Henry Orenstein, Verona, N.J.; James J. Maune, Plainview, N.Y.

[73] Assignee: Toy Builders, Caldwell, N.J.

[21] Appl. No.: 09/064,557

[22] Filed: Apr. 22, 1998

Related U.S. Application Data

[60] Provisional application No. 60/069,176, Dec. 10, 1997.

[51] Int. Cl.$^6$ .......................... A63B 67/00; A63B 61/00
[52] U.S. Cl. .................. 473/467; 473/353; 473/570; 342/127; 342/450
[58] Field of Search .................. 473/131, 351, 473/353, 459, 467, 469, 570, 409; 340/323 R, 825.36; 342/52, 56, 125–126, 450, 457, 458, 463–464; 343/720, 738, 755, 761; 364/449.1; 367/124, 126, 137–138

[56] References Cited

U.S. PATENT DOCUMENTS

| | | | |
|---|---|---|---|
| 3,782,730 | 1/1974 | Horchler | 473/353 |
| 4,542,906 | 9/1985 | Takase et al. | 473/152 |
| 4,673,183 | 6/1987 | Trahan | 342/465 |
| 4,675,816 | 6/1987 | Brandon et al. | 473/353 |
| 4,833,480 | 5/1989 | Palmer et al. | 342/125 |
| 4,836,551 | 6/1989 | LaSalle | 473/152 |
| 5,138,322 | 8/1992 | Nuttall | 473/467 |
| 5,150,895 | 9/1992 | Berger | 473/467 |
| 5,346,210 | 9/1994 | Utke et al. | 342/450 |
| 5,363,297 | 11/1994 | Larson et al. | 342/126 |
| 5,401,026 | 3/1995 | Eccher et al. | 473/199 |
| 5,423,549 | 6/1995 | Englmeier | 473/570 |
| 5,564,698 | 10/1996 | Honey et al. | 473/570 |
| 5,582,550 | 12/1996 | Foley | 473/353 |
| 5,615,880 | 4/1997 | Booth et al. | 473/570 |

*Primary Examiner*—Jessica J. Harrison
*Assistant Examiner*—Mark A Sager
*Attorney, Agent, or Firm*—Baker & Botts, LLP

[57] ABSTRACT

A system is provided with a directional antenna having first and second antenna patterns oriented around an antenna boresight direction. The antenna boresight is oriented in a direction corresponding to a play determinative line on a playing field. Signals are emitted firm a playing object, used as a ball and detect using the two antenna patterns. Comparison of the detected signals provides an output indication when the playing object crosses the play determinative line.

13 Claims, 2 Drawing Sheets

APPARATUS FOR DETECTING MOVING BALL

This application claims benefit of provisional application 60/069,176 filed Dec. 10, 1997.

BACKGROUND OF INVENTION

This invention concerns an apparatus for detecting the fact that a moving ball or other game piece has crossed a boundary or play determinative line on a playing field. It is particularly applicable to the game of football wherein it is important to the play of the game if a ball has advanced 10 yards or has crossed the goal line.

It is an object of the invention to provide an apparatus which will accurately and reliably detect the fact that a playing object has reached or crossed a linear boundary of a playing field. In particular it is an object of the invention to provide an apparatus which is not dependent on visual or optical observation and will function without interference by intervening players on the field.

SUMMARY OF THE INVENTION

In accordance with the invention there is provided a method for detecting coincidence between the position of an object and a linear boundary. According to the inventive method a directional receiving antenna is provided, which has at least two alternate antenna patterns having predetermined relation to an electromagnetic antenna boresight. The receiving antenna is positioned with the boresight in substantial alignment with the linear boundary. Radio signals are sent from the object and received on the antenna patterns to provide first and second received signals. The received signals are compared to detect coincidence between the object and the linear boundary.

There is also provided a system for detecting coincidence between the position of an object and a linear boundary. The system includes a directional receiving antenna having first and second signal output ports associated with first and second antenna patterns having predetermined relation to an electromagnetic boresight of the antenna. The boresight is aligned in predetermined relation to the linear boundary. The system includes a transmitter arranged to cause emission of radio signals from the object and signal comparison circuits coupled to the first and second signal output ports for comparing signals received from the object by the receiving antenna to thereby determine coincidence between the position of the object and the linear boundary.

In one arrangement the transmitter is positioned in the object. In another arrangement the transmitter illuminates the object with electromagnetic radiation, and the radiation is emitted from the object by reflection therefrom. In this case the object may include tuned reflectors.

In one arrangement the first and second signal output ports correspond to sum and difference antenna patterns. The signal comparison circuits may compare signals from the sum and difference ports at different gain levels thereby to enhance directional sensitivity in determining the coincidence.

In accordance with the invention there is provided a system for detecting coincidence between the position of an object and a linear boundary. The system includes a directional antenna for providing at least two antenna patterns having predetermined relation to an electromagnetic boresight of the antenna, the boresight being aligned in predetermined relation to the linear boundary. There is further provided a transmitter and a receiver arranged for transmission of radio signals between the directional antenna and the object using the two antenna patterns. Signal comparison circuits are provided for comparing signals received by the receiver corresponding to the two antenna patterns to thereby determine coincidence between the position of the object and the linear boundary.

In accordance with the invention there is provided apparatus for use in connection a game to determine the position of a playing object with respect to a linear boundary. The apparatus includes a directional antenna having at least two alternate antenna patterns having predetermined relation to an electromagnetic boresight of the antenna. A transmitter and a receiver are arranged for transmission of radio signals between the directional antenna and the playing object using the two antenna patterns. A signal comparison circuit compares signals corresponding to the two antenna patterns to thereby determine angular position of the playing object with respect to the electromagnetic boresight.

Accordingly, when the antenna is oriented and located with the electromagnetic boresight in predetermined relation to the linear boundary, the comparison circuits can determine the position of the playing object with respect to the linear boundary.

In a preferred arrangement the playing object comprises a football, the transmitter is located on the football, and the receiver is connected to the directional antenna. Two transmitters may be provided, one at each end of the football. The directional antenna can be located adjacent a football field and arranged for movement with respect thereto. The directional antenna may also be provided with an optical sight for orienting the electromagnetic boresight with respect to the field.

In accordance with the invention there is provided a football having tuned reflective elements, preferably for reflecting incident radiation having different polarizations.

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENTS

Figure 1:
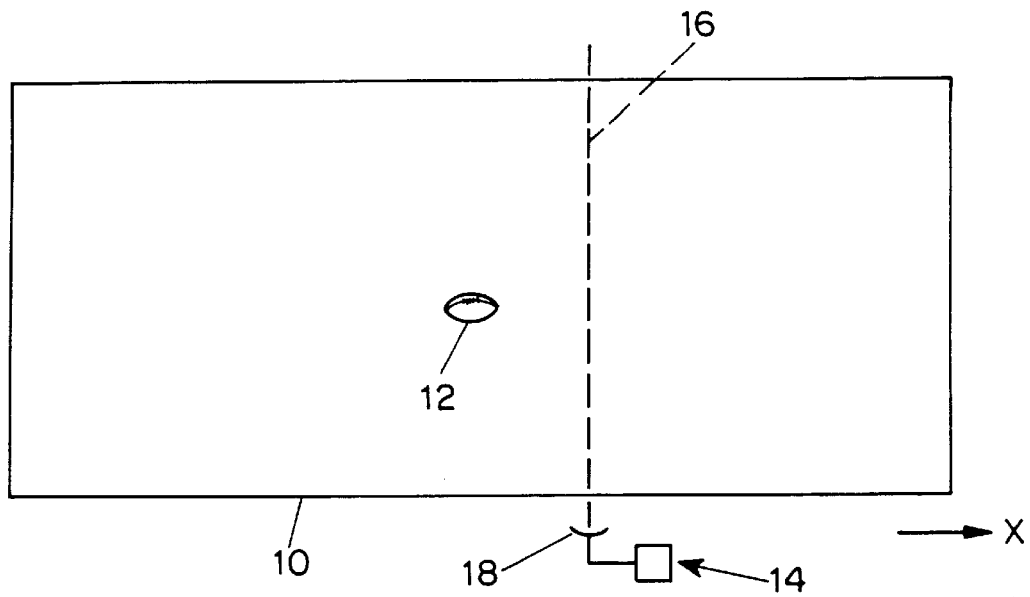
FIG. 1 depicts a football field having a system in accordance with the present invention.

An exemplary embodiment of the invention is illustrated in FIG. 1, which shows football field 10 having a ball 12 and a ball detecting apparatus 14 having an antenna 18. The dotted line 16 represents the antenna boresight, which is oriented either optically or electronically to face directly across the playing field defining a linear boundary. Electrical alignment may be provided by placing a dummy ball on the ground opposite antenna 18. Alternately, antenna 18 can be provided with optics 19 (FIG. 2) perpendicular to boresight 16 to be aligned with markers on the side of the end zone or zones.

Figure 2:
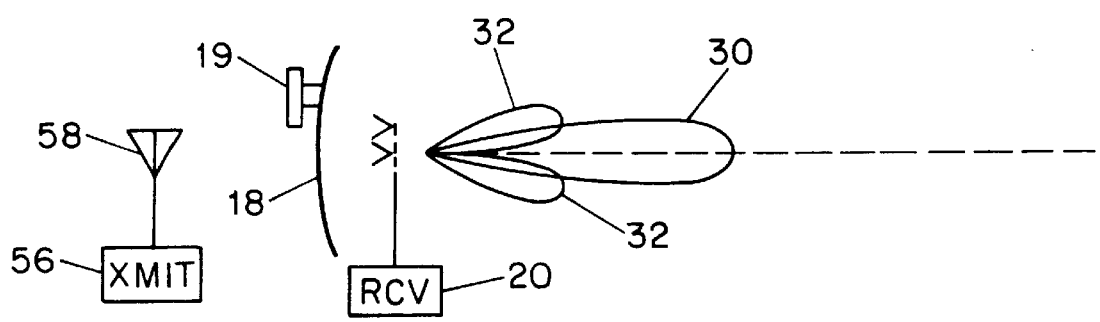
FIG. 2 depicts an antenna useful in the system of the present invention.

FIG. 2 illustrates the configuration of exemplary antenna 18 and receiver 20. Antenna 18 is a cassegrain antenna provided with dual, horizontally-adjacent feeds 22, which are combined in the conventional way to provide monopulse-type sum beam 30 and difference beam 32, shown as lobes in FIG. 2.

Figure 3:
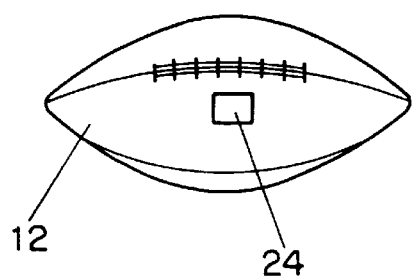
FIG. 3 shows one arrangement of a football according to the present invention.
Figure 4:
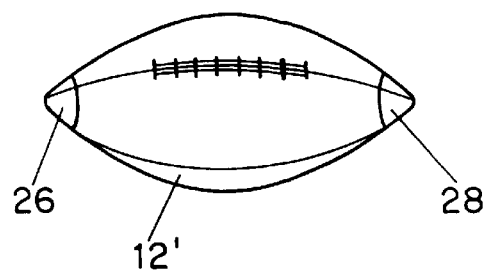
FIG. 4 shows an alternate arrangement of a football according to the present invention.

FIGS. 3 and 4 show footballs 12 and 12'. Football 12 is provided with a compact CW transmitter 24 located approximately centrally in the ball. Football 12' is provided with dual CW transmitters 26 and 28, located at opposite ends of the ball, which may have different transmission frequencies.

Figure 5A:
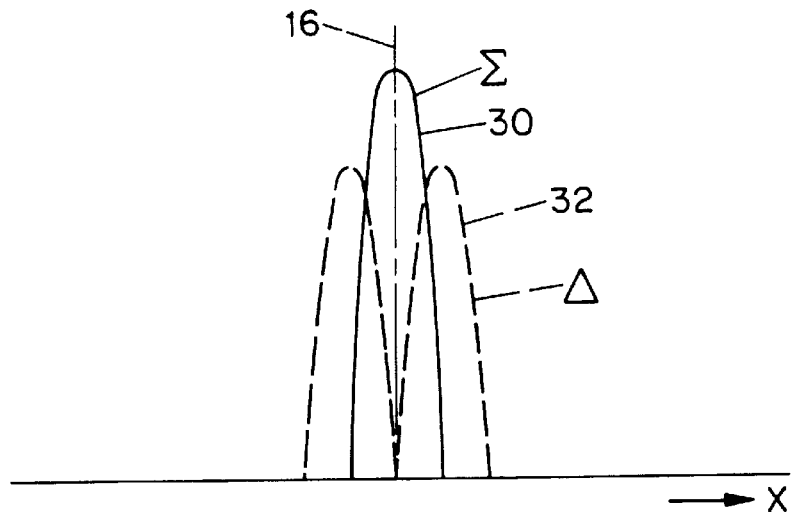
FIGS. 5A and 5B depict antenna patterns useful in connection with the present invention.

FIG. 5A illustrates the receiving patterns 30, 32 for the antenna beams plotted along the length X of field 10. It will be noted that at the antenna boresight 16, sum pattern 30 shows a peak while difference pattern 32 shows a sharp null.

Figure 5B:
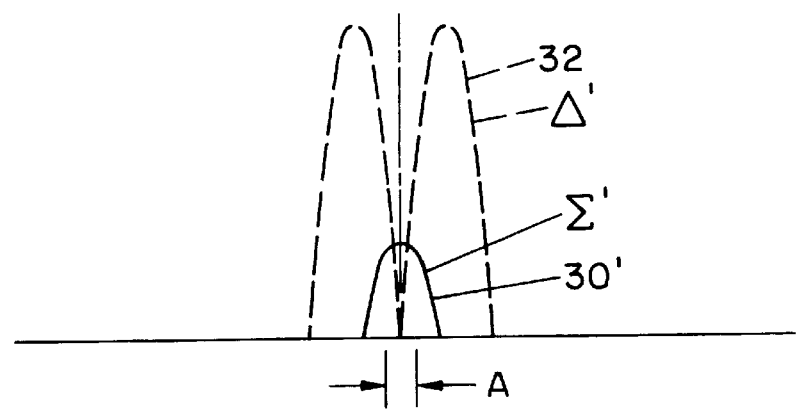

FIG. 5B shows the FIG. 5A patterns wherein the difference signal has been amplified much more than the sum signal. As a result of the difference signal amplification, the sum signal exceeds the difference signal only in a small angular range A, which can be much smaller than the antenna beamwidth.

Figure 6:
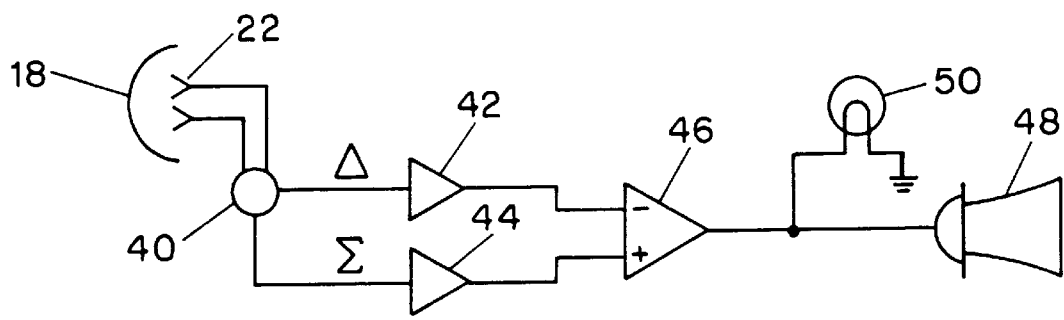
FIG. 6 is a block diagram illustrating an antenna and comparator useful in the practice of the invention.

FIG. 6 shows the receiver and detection arrangement for the apparatus of the invention. Signals received on the two feeds 22 are provided to hybrid junction 40 to form sum and difference channels. The signals are received and the difference signal amplified more than the sum as shown in FIG. 5B, which provides "artificial beam sharpening". The signals are amplified in receivers 42, 44 and the detected signals are provided to differential amplifier 46 which outputs a pulse only when the transmitter in the ball crosses the narrow angular boresight of the antenna represented by the region A in FIG. 5B. The detection can be latched and used to trigger a horn 48 or a signal lamp 50.

Those skilled in the art will recognize that the boresight detection according to the invention can be achieved by other methods. For example, the antenna can use a single beam that is scanned across the boresight axis, and the time of received signals from the ball can be analyzed to detect boresight crossing. Alternately, an antenna can have overlapping beams that cross at the boresight axis and the amplitude crossover can be detected. By using a boresight detection process, a sharp angle, for example less than 1 degree, preferably less than one-half degree can be realized using, for example, an X-band antenna of about 30 inch reflector width. The normal antenna beamwidth will be about 2°, which can be sharpened to 0.2° or less. This corresponds to about 4 inches at a distance of 40 yards. Further beam sharpening, higher frequency or a larger antenna will further reduce the width of the detection zone. Alternately, using a detector on both sides of the field, the size of the detection zone will be reduced by half.

Where the football 12' has transmitters 26, 28 located at each end, the transmitters can operate at different frequencies to be non-interfering. In this case, two receivers are coupled to receive the signals form hybrid 40 to separately compare the signal from each end of the football to detect the boresight crossing by either end. To assure detecting, the transmitter or transmitters in the football are preferably dual polarized, for example circularly polarized with the electric field perpendicular to the length axis of the ball.

It will be recognized that the transmitters on the football may be powered by a small battery. Alternately, a signal may be emitted toward the ball to be received and rectified to power the transmitter.

Figure 7:
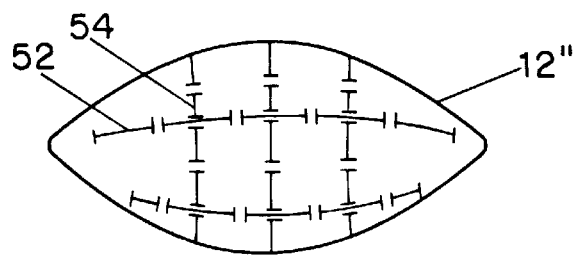
FIG. 7 depicts a football having tuned reflectors.

A still further alternative can be realized by coating the ball with reflective coating, including a resonant coating, and illuminating the ball with energy to be reflected toward the receiving antenna 18. FIG. 7 shows a football provided with tuned reflective elements consisting of resonant dipole arrays, formed of small wires or foil, with elements 52 oriented to reflect radio signals with polarization along the axis of the ball and elements 54 oriented to reflect radio signals with polarization perpendicular to the axis of the ball. The ball 12" thus acts as a tuned reflector independent of its orientation. When using a reflective ball 12", the transmitter 56 can be located with the receiving antenna 18 and oriented to radiate toward ball 12".

In another alternate, the ball may act as the receiver and respond to signals emitted by the system to detect boresight crossing.

Alternately, the boresight can be oriented slightly toward the goal such that the signal crossover between sum and difference patterns is perpendicular to the length of the field.

The present invention can provide accurate determination of boundary crossing by a playing object in a game, even where the official cannot observe the play because intervening players block the field of view. Antenna 18 is moved to a position adjacent the playing field whereat the boresight 16 is aligned with a playing boundary, such as 10 yards from the prior ball position or the goal. When the ball crosses the boresight, the system detects the crossing and signals the officials and the fans.

It will be recognized that the present invention may be applied to other games to detect scoring or out-of-bounds movement of a playing object.

While there have been described what are believed to be the preferred embodiments of the invention, those skilled in the art will recognize that other and further changes may be made thereto without departing from the spirit of the invention, and it is intended to claim all such changes and modifications as fall within the true scope of the invention.

We claim:

1. A method for detecting coincidence between a position of an object and a linear boundary, comprising the steps of:
   providing a directional receiving antenna having at least two alternate antenna patterns having predetermined relation to an electromagnetic antenna boresight, said receiving antenna being positioned with said boresight in substantial alignment with said linear boundary;
   emitting radio signals from said object;
   receiving said radio signals on said at least two antenna patterns to provide first and second received signals;
   and comparing said received signals to thereby detect coincidence between said object and said linear boundary.

2. A system for detecting coincidence between a position of an object and a linear boundary, comprising:
   a directional receiving antenna having first and second signal output ports associated with first and second antenna patterns having predetermined relation to an electromagnetic boresight of said antenna, said boresight being aligned in predetermined relation to said linear boundary;
   a transmitter arranged to cause emission of radio signals from said object;

and signal comparison circuits coupled to said first and second signal output ports for comparing signals received from said object by said receiving antenna to thereby determine coincidence between the position of said object and said linear boundary.

3. Apparatus as specified in claim 2 wherein said transmitter is positioned in said object.

4. Apparatus as specified in claim 2 wherein said first and second signal output ports correspond to sum and difference antenna patterns.

5. Apparatus as specified in claim 4 wherein said signal comparison circuits compare signals from said sum and difference ports at different gain levels thereby to enhance directional sensitivity in determining said coincidence.

6. Apparatus for detecting coincidence between a position of an object and a linear boundary, comprising:

a directional receiving antenna having first and second signal output ports associated with first and second antenna patterns having predetermined relation to an electromagnetic boresight of said antenna, said boresight being aligned in predetermined relation to said linear boundary;

a transmitter for illuminating said object with radio frequency radiation;

a radio frequency reflector carried by said object to reflect radiation;

and signal comparison circuits coupled to said first and second signal output ports for comparing reflected signals received from said object by said receiving antenna to thereby determine coincidence between the position of said object and said linear boundary.

7. Apparatus as specified in claim 6 wherein said reflector comprises at least one tuned reflector.

8. Apparatus for detecting coincidence between a position of an object and a linear boundary, comprising:

a directional antenna for providing at least two antenna patterns having predetermined relation to an electromagnetic boresight of said antenna, said boresight being aligned in predetermined relation to said linear boundary;

a transmitter and a receiver arranged for transmission of radio signals between said directional antenna and said object using said at least two antenna patterns;

and signal comparison circuits for comparing signals received by said receiver corresponding to said at least two antenna patterns to thereby determine coincidence between the position of said object and said linear boundary.

9. Apparatus for use in connection with a game having a linear boundary, comprising:

a directional antenna having at least two alternate antenna patterns having predetermined relation to an electromagnetic boresight of said antenna;

a transmitter and a receiver arranged for transmission of radio signals between said directional antenna and a playing object of said game using said at least two antenna patterns;

and signal comparison circuits for comparing signals corresponding to said at least two antenna patterns to thereby determine angular position of said playing object with respect to said electromagnetic boresight;

whereby when said antenna is oriented and located with said electromagnetic boresight in predetermined relation to said linear boundary, said comparison circuits determine the position of said playing object with respect to said linear boundary.

10. Apparatus as specified in claim 9, wherein said object comprises a football, and wherein said transmitter is located on said football and said receiver is connected to said directional antenna.

11. Apparatus as specified in claim 10 wherein there are provided two transmitters, one at each end of said football.

12. Apparatus as specified in claim 10 where in said directional antenna is located adjacent a football field and arranged for movement with respect thereto.

13. Apparatus as specified in claim 12 wherein said directional antenna is provided with an optical sight for orienting said electromagnetic boresight with respect to said field.

\* \* \* \* \*